Patented Apr. 22, 1924.

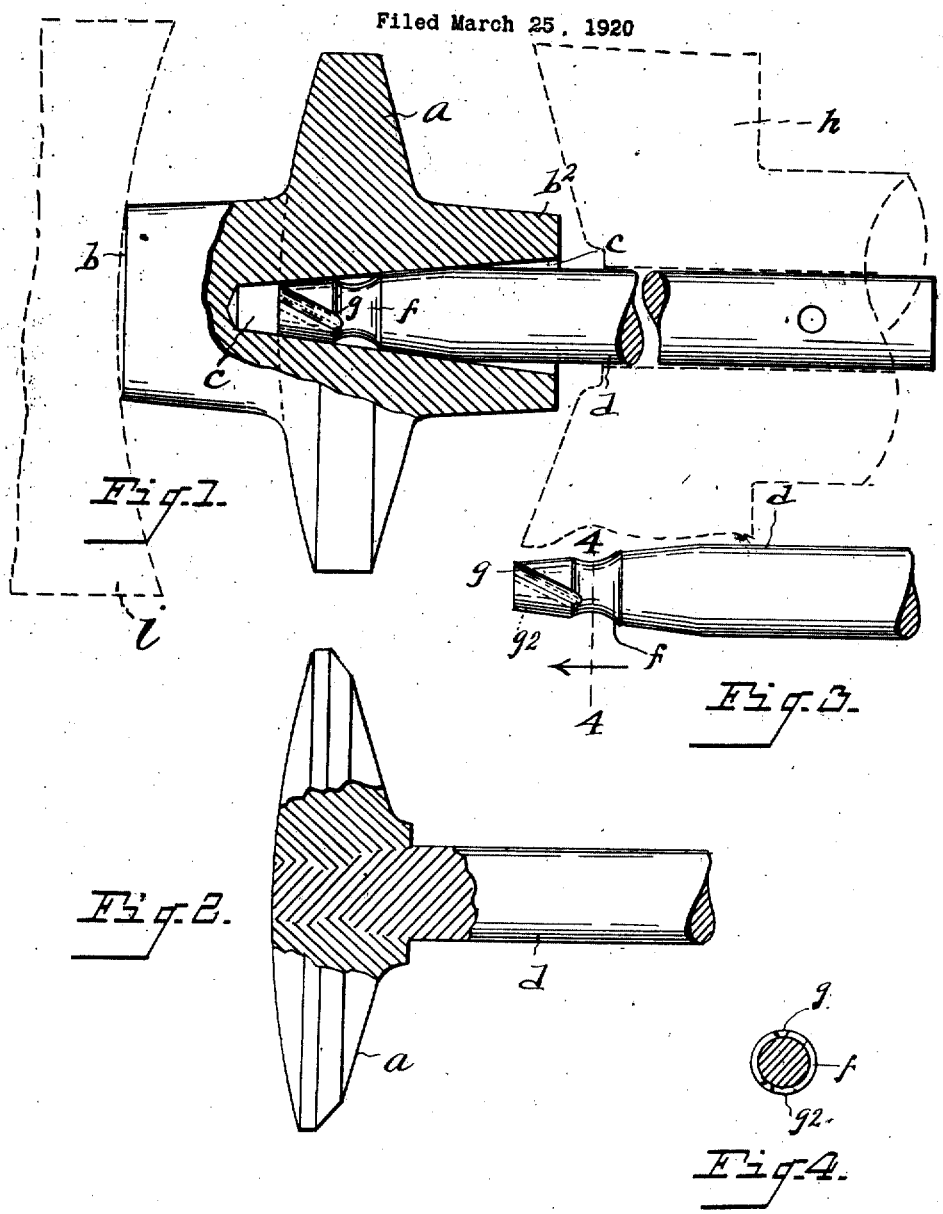

1,491,073

UNITED STATES PATENT OFFICE.

JAY L. WELLS, OF DETROIT, MICHIGAN, ASSIGNOR TO GENERAL MOTORS COMPANY, OF DETROIT, MICHIGAN, A CORPORATION OF DELAWARE.

METHOD OF MANUFACTURING VALVES.

Application filed March 25, 1920. Serial No. 368,726.

*To all whom it may concern:*

Be it known that I, JAY L. WELLS, citizen of the United States, residing at Detroit, county of Wayne, State of Michigan, have invented a certain new and useful Improvement in Methods of Manufacturing Valves, and declare the following to be a full, clear, and exact description of the same, such as will enable others skilled in the art to which it pertains to make and use the same, reference being had to the accompanying drawings, which form a part of this specification.

My invention relates to a method of manufacturing valves. The object is to form a valve with a cast iron head welded to a metal stem. The stem would preferably be formed of steel and the welding process here shown is an electrical one. This method consists in the shaping of the head and stem after a peculiar fashion and in the process of welding adopted.

In the drawing,—

Figure 1 is an elevation partly in cross-section of the valve before the welding process has begun.

Fig. 2 is an elevation partly in cross-section of a completely formed valve.

Fig. 3 is an elevation of the valve stem.

Fig. 4 is a cross-section taken on the line IV—IV of Fig. 3.

In the welding of a cast-iron head to a steel stem to form a valve, many methods have been and are now in use both electrical and with the oxy-acetylene torch. Very generally the result has failed to meet the expectation and the jointure formed between the head and the stem has proven to be faulty. In the process of electrically welding these parts together, a perfect jointure is very rarely the result. At one particular spot the weld may be perfect, but due to the different temperatures at which steel and cast iron melt, the difference in cross-sectional area of the parts to be welded and the lack of means to control the heat in other methods, oxidization at the surface or due to imperfections in the metal itself the weld at other points will be imperfect.

Applicant provides a specially formed head and stem. The stem is inserted within a recess provided in the head and the electric current is allowed to flow therethru intermittently so as to soak the heat inwardly. Pressure is then exerted on opposite sides of the head so as to force the metal of the head, when in the melted state, inwardly into the grooves formed in the stem fusing said head and stem together. The head and stem are formed by cutting or shearing the excessive material away to make a completed valve.

Let $a$ represent a cast iron valve head formed with an axial portion projecting substantially equally beyond each face thereof indicated as $b$ and $b^2$. The portion $b^2$ which projects from the face of the valve which will form the seat thereof and thru which the stem is inserted, is axially perforated as shown, providing a tapered recessed opening $c$ extending thru this axial portion $b^2$ and thru the portion $a$ which will form the head of the completed valve and into the oppositely disposed axial portion $b$. This recess is tapered inwardly. A stem $d$ is tapered as at $e$, the taper being such as to permit the stem to enter the recessed opening $c$ in the valve head sufficiently so that the end of the stem will lie flush with the projection of the surface plane of the opposite face of the valve. It will be seen that the stem does not completely fill this recessed opening. It will be further observed that the taper of the recessed opening and the stem will so coact as to gage the distance the stem will project into this recessed opening. The stem is further provided with a circumferential groove around its tapered portion indicated as $f$. Leading from this circumferential groove to the tapered end of the stem are spiral grooves $g$ and $g^2$ crossing each other so as to lock the stem when welded in position. The stem so formed is inserted in the opening provided in the head. I provide a suitable electrical welding machine for welding the head and stem together. For purposes of explanation I prefer to show in diagram in Fig. 1 electrical contact terminals $h$ and $i$. Contact terminal $h$ is provided with a central passageway through which the stem extends and is provided with a concave die face adapted to exert pressure inwardly upon the portion $b^2$ of the head. The opposite contact terminal $i$ is likewise formed with a concave face adapted to exert pressure on the opposite portion $b$ of the head. The electrical current is then passed through the head and stem: Pressure inwardly is exerted on the portions $b$ and $b^2$ of the head and when the metal in the head has melted sufficiently the pressure exerted at opposite sides of the head forces such molten metal into the grooves $f$ and $g$ in the stem completely filling said grooves. The metal of the head and stem is likewise fused together. It is suggested that the electrical current be permitted to flow thru intermittently so as not to produce too high a temperature at the contact points before the interior of the head is heated.

It will be further observed that the electric contacts do not lie directly against the face of the valve head and that such burning of metal as might take place at those contact points would not injure the formed valve head in any way.

What I claim is:

1. In the process of making a valve by forming a cast iron head with a substantially equal axial portion projecting from each side thereof, forming an axial recess in said head, inserting a valve stem therein, electrically welding the same in place by disposing the electric contact terminals of the welding machine at opposite ends of the axial portion of the head, passing electric current therethrough and exerting inward pressure thereon.

2. In a method of manufacturing valves, forming a cast iron head with an axial projection extending from each side thereof, axially perforating said head thru and slightly beyond that portion which will form the completed head, inserting a valve stem within said axial perforation, electrically welding said stem in place by applying electric contacts of the welding machine to opposite ends of said axial portion and exerting pressure inwardly toward the head, removing the excess of metal to shape the valve to form.

3. The improvement in the art of making a valve consisting of forming a cast iron head with an axial portion projecting from each side thereof, forming an axial recess in said head through one of said axial portions, such recess being tapered inwardly, inserting a stem tapered to enter said recess until the end of the stem is substantially flush with the projection of the surface plane of the face of the head opposite the side from which the stem is entered, electrically welding said stem in position by applying contact terminals of a welding machine to opposite ends of the axial portion of the head and passing electrical current intermittently therethru, exerting pressure upon said axial portions inwardly toward the head, removing the excess of metal to shape the valve.

4. The improvement in the art of manufacturing valves which consists in forming a cast iron head provided with an axial portion projecting from each side thereof, forming an axial tapered recess in said cast iron head through one of said axial portions, providing a metal stem tapered to enter said recess but not to pass thru and beyond that portion of the head which will form the completed valve, inserting said valve stem in said recess, electrically welding the same in place by applying electric current to said head and stem and exerting pressure inwardly toward the head upon said axially projecting portions.

5. In a method of manufacturing valves, forming a cast iron head with an axial portion projecting from opposite sides thereof and which is substantially larger in diameter than the valve stem to be fitted to the head forming a tapered axial recess through the head portion of the casting which extends into the axial portion, inserting a tapered metal stem into such recess, which stem is of such dimension as not to extend beyond the opposite face of the completed valve head, fusing said stem and head together by passing an electrical current therethrough and exerting pressure inwardly on opposite sides of said head during the time it is in a heated condition, shaping said head to form.

6. In a process for making valves, forming a cast iron head provided with an axial portion of substantially greater diameter than the stem to be fitted therein projecting from each side of said head, providing a tapered axial recess in said head adapted to receive a tapered stem, providing a tapered stem adapted to enter said recess and formed with a circumferential groove and spiral grooves extending from the end of said taper to said circumferential groove, inserting said stem in said recess, welding the same in place by applying contact terminals of the welding mechanism to the ends of the axial portion carried by the head, passing electric current through said head and stem and exerting pressure inwardly toward the head on the opposite ends of the axial portion.

7. The process of making a valve, consisting in providing a cast iron head with an axial portion projecting from each side thereof, forming an axial recess in said head through one of said projecting portions, inserting a valve stem in said recess, electrically welding the stem in place by disposing the electrical contact terminals of the welding machine at opposite ends of the axially projecting portion of the head, passing electric current and exerting inward pressure thereon.

8. A method of making articles such as valves comprising the formation of a head having an integral boss and a socket adjacent thereto, positioning a stem in said socket, softening the metal of said boss and adjacent portions of the head by heating, and causing said metal to take the form of and closely fit the end of the stem.

9. A method of making articles such as valves comprising the formation of a head having an integral boss and a socket adjacent thereto, positioning in said socket a stem having portions formed to interlock with the metal of said head, softening the metal of said boss and adjacent portions of the head by heating, and causing the softened metal to conform to and interlock with the stem.

10. A method of making articles such as valves comprising the formation of a head having an integral boss located centrally of one side and a central socket, positioning a stem within said socket with its end below said boss, and fusing the metal of the boss and adjacent portions of the head to permit said metal to flow around and closely fit the end of the stem, the boss containing sufficient metal to take the place of that flowing into the socket.

11. A method of making articles such as valves comprising the formation of a cast metal head having an integral boss located centrally of one side and a central socket, positioning a stem in said socket, said stem having portions formed to interlock with the metal of the head when fused, and fusing the metal of the boss and adjacent portions of the head to permit said metal to flow around and form interlocking engagement with said portions.

12. A method of making articles such as valves comprising the formation of a head having a socket therein, positioning a stem within said socket, and softening the metal of said head to permit said metal to flow around the end of said stem by passing electric current through said head, the electrodes being arranged to contact with the head only.

13. A method of making articles such as valves comprising the formation of a head member having a socket therein, positioning a stem within said socket, causing one electrode to engage with the head over the socket and another with the head around but out of contact with the stem, and passing current between said electrodes to cause the softening of the metal of the head whereby said metal may be caused to fit closely the portion of the stem positioned within said socket.

14. A method of making articles such as valves comprising the formation of a head having an integral boss thereon and a socket, positioning a stem within said socket, causing one electrode to contact with said boss and another with the head independently of the stem and passing current between said electrodes to cause the softening of the metal of said head whereby said metal may be caused to fit closely the end of the stem.

15. A method of making valves comprising the formation of a head having an integral boss centrally positioned thereon and a socket on the side opposite said boss and centrally thereof, positioning a stem within said socket, placing electrodes in contact, one with the boss and the other with the head around but out of contact with the stem, passing current between said electrodes and through the boss and head to thereby soften the material of the boss and head, and causing the same to flow about and fit closely to the end of the stem.

In testimony whereof, I sign this specification.

JAY L. WELLS.